United States Patent
Malik et al.

(10) Patent No.: US 11,615,061 B1
(45) Date of Patent: Mar. 28, 2023

(54) EVALUATING WORKLOAD FOR DATABASE MIGRATION RECOMMENDATIONS

(71) Applicant: Amazon Technologies, Inc., Seattle, WA (US)

(72) Inventors: Sameer Malik, Irvine, CA (US); Danial George Neault, Los Gatos, CA (US); Rostislav Babocichin, Bothell, WA (US); Harpreet Kaur Chawla, Menlo Park, CA (US); Knievel Co, Renton, WA (US); Ilia Gilderman, Bellevue, WA (US); Ramya Kaushik, Seattle, WA (US); Edward Paul Murray, Sammamish, WA (US); Siva Raghupathy, Seattle, WA (US); Venu Reddy, Cupertino, CA (US); Samujjwal Roy, Bellevue, WA (US); Eran Schitzer, Sunnyvale, CA (US); Michael D. Soo, Irvine, CA (US); Arun Kumar Thiagarajan, Bothell, WA (US); John Winford, Vancouver (CA); Chen Zhang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 309 days.

(21) Appl. No.: 16/054,686

(22) Filed: Aug. 3, 2018

(51) Int. Cl.
  *G06F 16/21* (2019.01)
  *G06F 9/50* (2006.01)
  *G06F 16/25* (2019.01)

(52) U.S. Cl.
  CPC .......... *G06F 16/214* (2019.01); *G06F 9/5083* (2013.01); *G06F 16/254* (2019.01)

(58) Field of Classification Search
  CPC ..... G06F 16/214; G06F 16/254; G06F 9/5083
  See application file for complete search history.

(56) References Cited

U.S. PATENT DOCUMENTS

| | | | |
|---|---|---|---|
| 7,299,216 B1 | 11/2007 | Liang et al. | |
| 8,087,013 B2 | 12/2011 | Kelly et al. | |
| 8,312,323 B2 | 11/2012 | Gokhale et al. | |
| 8,914,789 B2 | 12/2014 | Barros et al. | |
| 2004/0225631 A1* | 11/2004 | Elnaffar | G06N 20/00 |
| 2012/0016835 A1* | 1/2012 | Singh | G06F 16/254 |
| | | | 707/603 |

(Continued)

OTHER PUBLICATIONS

U.S. Appl. No. 15/688,655, filed Aug. 28, 2017, Ilia Gilderman et al.

(Continued)

*Primary Examiner* — Vaishali Shah
(74) *Attorney, Agent, or Firm* — S. Scott Foster; Kowert, Hood, Munyon, Rankin & Goetzel, P.C.

(57) ABSTRACT

A workload of a database may be evaluated to provide a database migration recommendation. A request for a recommendation to migrate a database to a new host may be received. An evaluation of the workload of a client application of the database at a current host may be performed. The migration recommendation may be returned based on the evaluation of the workload of the client application of the database. In some embodiments, the migration recommendation may trigger an automated migration of the database to the new host.

20 Claims, 12 Drawing Sheets

(56) References Cited

U.S. PATENT DOCUMENTS

| | | | |
|---|---|---|---|
| 2012/0185913 A1* | 7/2012 | Martinez | H04L 67/02 |
| | | | 726/1 |
| 2013/0339943 A1* | 12/2013 | Mallya | G06F 16/214 |
| | | | 717/176 |
| 2014/0136516 A1* | 5/2014 | Clifford | G06F 11/3419 |
| | | | 707/719 |
| 2015/0019488 A1 | 1/2015 | Higginson et al. | |
| 2015/0096011 A1* | 4/2015 | Watt | G06F 3/0647 |
| | | | 726/15 |
| 2016/0063050 A1 | 3/2016 | Schoen et al. | |
| 2016/0092801 A1* | 3/2016 | Carden | G06Q 10/0631 |
| | | | 705/7.12 |
| 2016/0098425 A1* | 4/2016 | Brunswig | G06F 16/245 |
| | | | 707/607 |
| 2016/0117350 A1* | 4/2016 | Park | G06F 16/283 |
| | | | 707/602 |
| 2016/0210342 A1* | 7/2016 | Vallabhaneni | G06F 11/1469 |
| 2017/0006105 A1* | 1/2017 | Shraer | H04L 67/1025 |
| 2018/0097874 A1* | 4/2018 | Sampathkumar | H04L 67/1023 |
| 2018/0322178 A1* | 11/2018 | Gitelman | G06F 16/24542 |
| 2019/0303034 A1* | 10/2019 | Gaertner | G06F 12/0238 |
| 2019/0340251 A1* | 11/2019 | Peddada | G06F 21/602 |
| 2020/0012970 A1* | 1/2020 | Srivastava | G06N 20/00 |
| 2020/0021314 A1* | 1/2020 | Medard | H03M 13/2927 |
| 2020/0034077 A1* | 1/2020 | Haravu | G06F 3/0647 |

OTHER PUBLICATIONS

U.S. Appl. No. 15/679,107, filed Aug. 16, 2017, Ilia Gilderman et al.

\* cited by examiner

EVALUATING WORKLOAD FOR DATABASE MIGRATION RECOMMENDATIONS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. The increasing amount of data that organizations must store and manage often correspondingly increases both the size and complexity of data storage and management technologies, like database systems, which in turn escalate the cost of maintaining the information. New technologies seek to reduce both the complexity and storage requirements of maintaining data by introducing different data stores or data formats that offer different processing or maintenance capabilities. However, introducing multiple data formats is not without cost. Data is often processed by different systems which may not support the current data format of the data. Thus, the ability to perform techniques to move data between data stores that offer different capabilities, locations, or formats is desirable.

Figure 1:
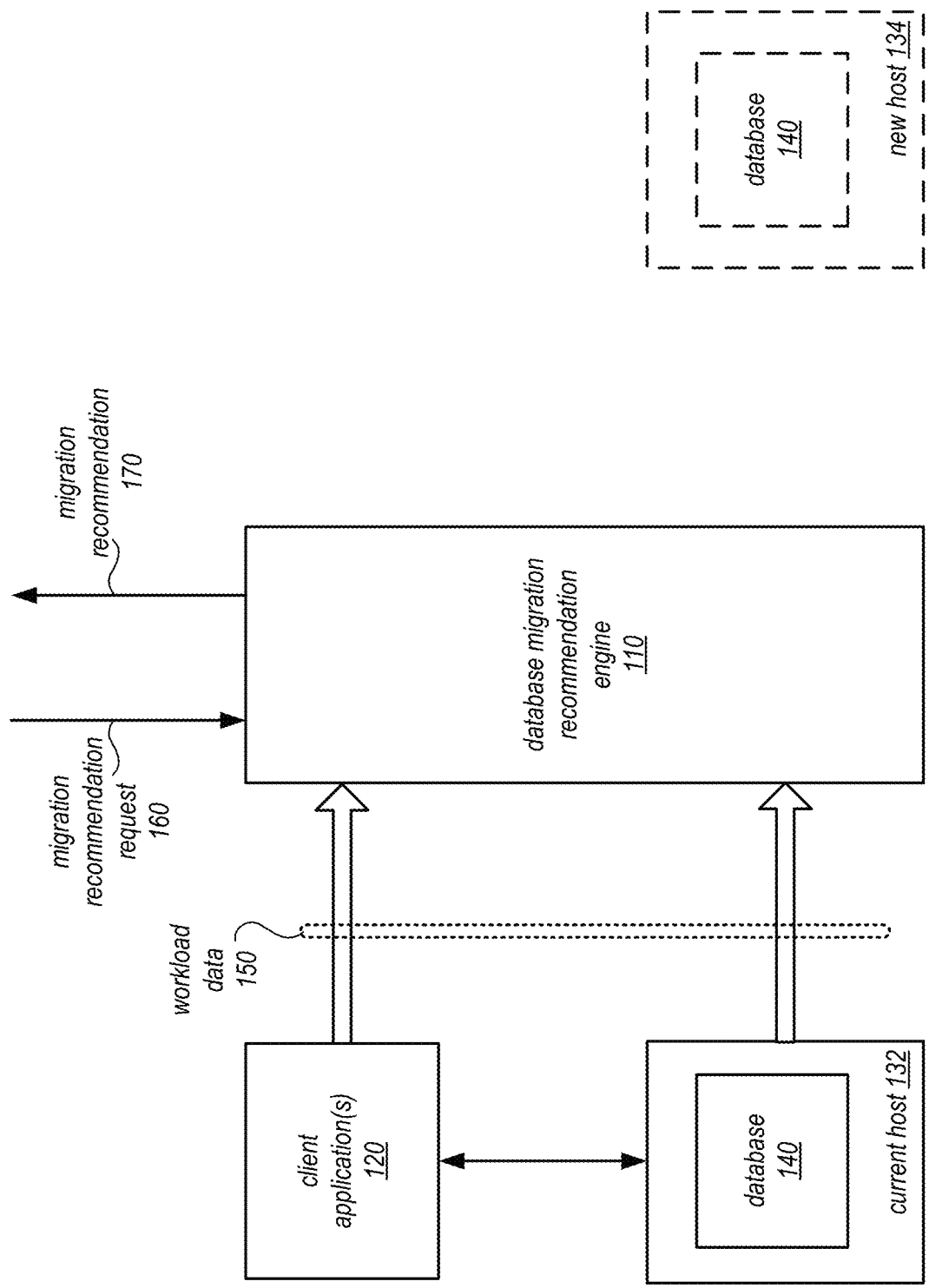
FIG. 1 is a logical block diagram illustrating evaluating workload for database migration recommendations, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of migration task validation before data migrations are described herein. Data migration may be performed in various embodiments in order to move data from a current location to a desired new location. The new location may, for instance, utilize a different storage engine or have different storage capacity (or other hardware capabilities) that make accessing the data more desirable, in some embodiments. Data migration techniques may transform or otherwise modify the data as part of migration, in various embodiments. For example, data stored in a source data store may be stored in a data format (e.g., a file format, schema, etc.) that is different the data format used or supported by the target data store, in some embodiments. Data migration, therefore may convert the data from the format of the source data store to the format of the target data store, in one embodiment.

Because data migrations can move large amounts of data, data migration operations may be costly in terms of resources and time to perform, in some embodiments. When data migrations fail to complete due to errors or fail to provide correct results (even if all of the data is migrated) due to errors, the resulting loss in resources and time may be great, in one embodiment, because the entire migration may need to be performed again (in addition to time spent identifying the error and performing a corrective action). Furthermore, data migrations may also affect the client applications or other systems that interact with the data, in some scenarios, as format or data store/database system supported features may be different when data is migrated. A data migration recommendation that can evaluate the costs and risks of performing a database migration, however, can significantly reduce the costs of data migration errors by accurately predicting migration cost, complexity, and risk.

FIG. 1 is a logical block diagram illustrating evaluating workload for database migration recommendations, according to some embodiments.

Database migration recommendation engine 110 may perform various techniques to make database migration recommendations 170 in response to requests (according to the various techniques discussed below in FIGS. 4-13), in some embodiments. A database migration recommendation engine 110 may be implemented to identify a migration recommendation for a database 140 at a current host 132 utilized by client application(s) 120 for migration to a new host, such as new host 134, in some embodiments. As new host 134 may offer different capabilities, have or support different features (or limitations), database migration recommendation engine 110 may evaluate workload data 150 for database 140 in order provide a database migration recommendation that can better assess the costs, risks, and/or complexity of migrating database 140 to new host 134. For example, current host 132 may be implemented as part of private network (e.g., a private data center for an entity) whereas new host 134 may be implemented as part of a public service (e.g., a provider network as discussed below with regard to FIG. 2). Migration recommendation 170 may be able to identify the various features of the workload data for database 140 and categorize the migration in order to make a cost benefit analysis available to the user/entity/owner of database 140, in some embodiments.

Migration recommendations 170 that account for the workload of client application(s) 120 may offer valuable insights that improve the performance of migration systems, such as data migration service 220 in FIG. 2 below, and/or current or future implementations of client application(s) 120. For example, customized feature dependencies in client application(s) 120 may be identified and removed in place of destination supported features that can reduce the amount of client-side customization or code (e.g., improving client application performance). In another example, a migration system that performs a database migration can automatically modify or adapt migration workflows to incorporate identified workload features that can be optimized or supported in the destination host.

Please note that the previous description of evaluation of database workload for database migration is a logical illustration and thus is not to be construed as limiting as to database migration recommendation engine, host, database, or client application.

This specification begins with a general description of a provider network that implements data migration service that migrates data both within and outside of the provider network and which performs evaluating workload for database migration recommendations. Then various examples of the data migration service including different components/modules, or arrangements of components/module that may be employed as part of implementing the data migration service are discussed. A number of different methods and techniques to implement evaluating workload for database migration recommendations are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
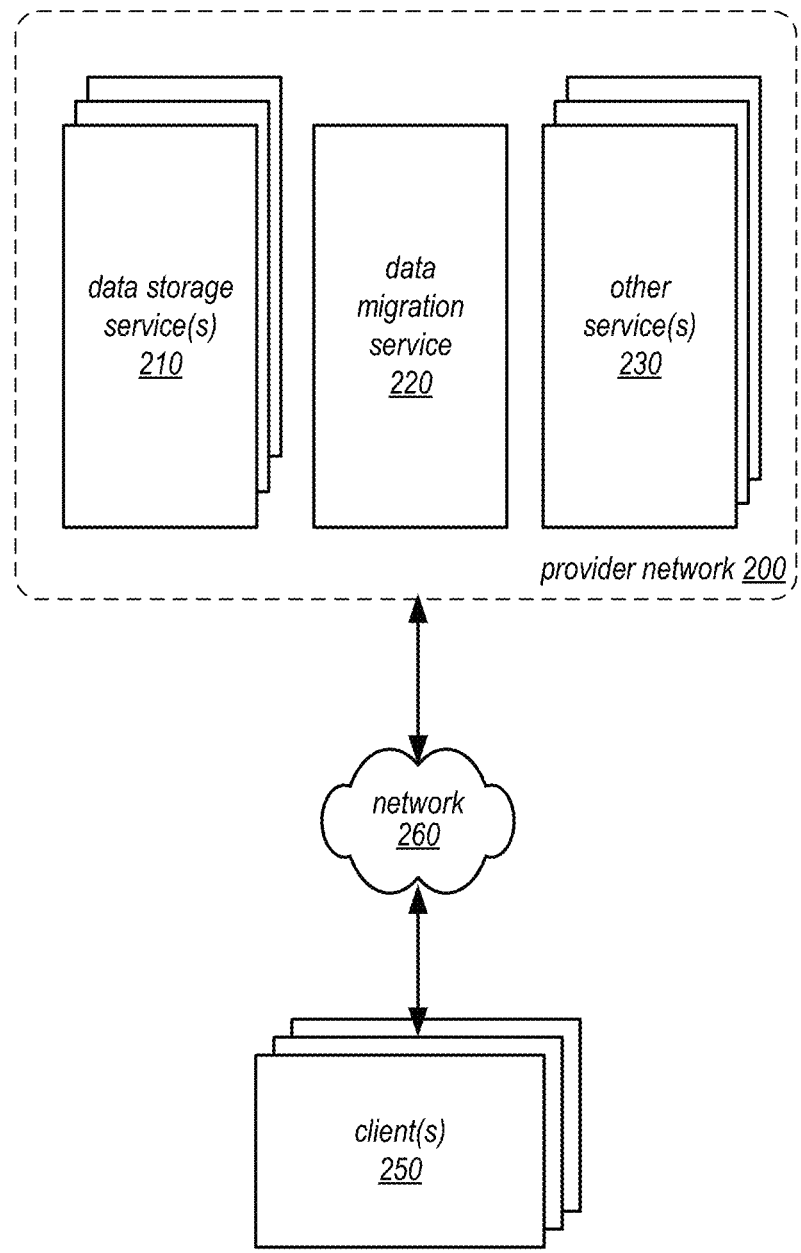
FIG. 2 is a logical block diagram illustrating a provider network offering different services including a data migration service that performs migration recommendations for databases, according to some embodiments.

FIG. 2 is a logical block diagram illustrating a provider network offering different services including a data migration service that performs migration recommendations for databases, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 14), needed to implement and distribute the infrastructure and storage services offered by the provider network 200. In some embodiments, provider network 200 may implement various computing resources or services, such as a data storage service(s) 210 (e.g., database services, object storage services, block-based storage services, or data warehouse storage services), data migration service 220, as well as other service(s) 230, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 14 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) or data warehouses for storing, querying, and updating data. Such services may be enterprise-class database systems that are scalable and extensible. Queries may be directed to a database or data warehouse in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 210 may also include various kinds of object or file data stores for putting, updating, and getting data objects or files, which may include data files of unknown file type. Such data storage service(s) 210 may be accessed via programmatic interfaces (e.g., APIs), command line interfaces, and/or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

Figure 3:
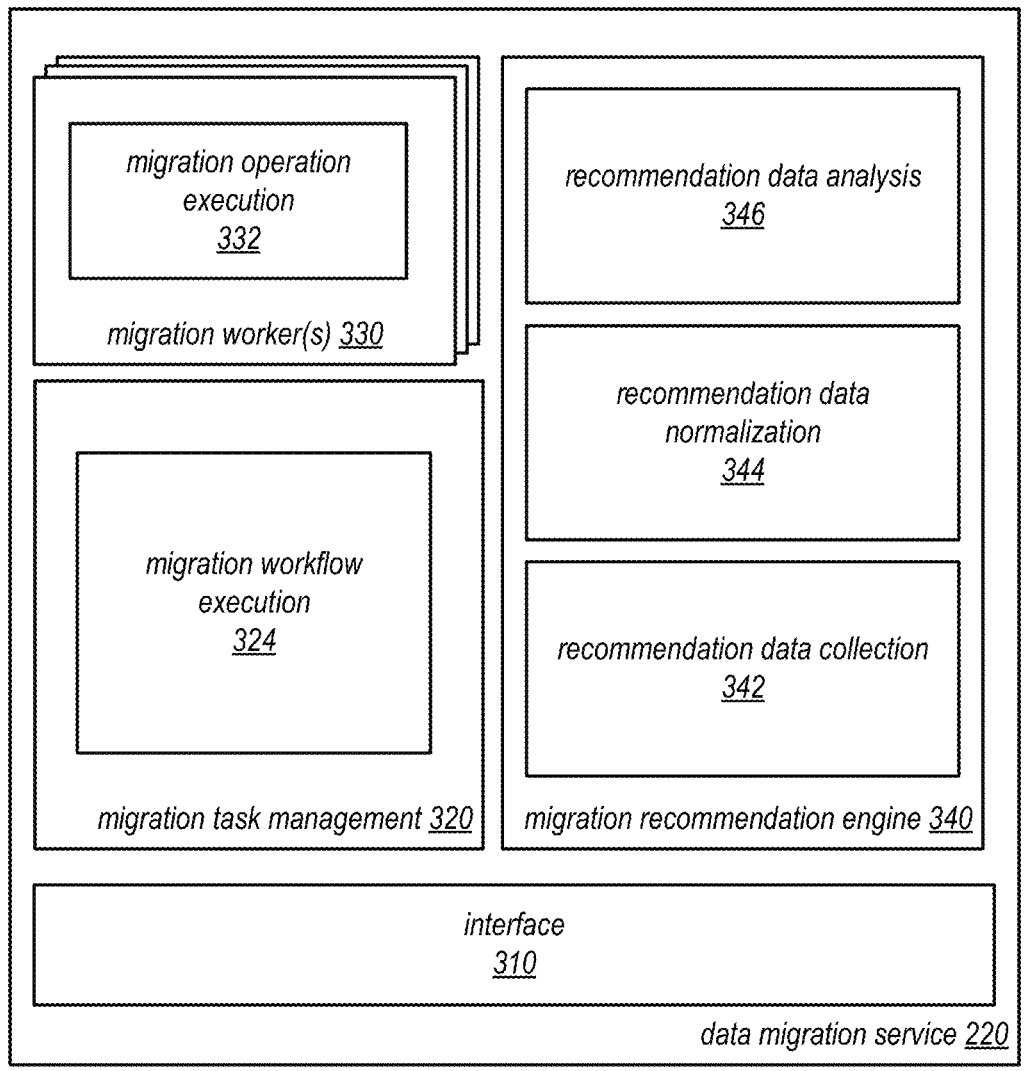
FIG. 3 is a logical block diagram illustrating a data migration service that may implement a migration recommendation engine, according to some embodiments.

In some embodiments, data migration service 220 may perform data migrations between data stores. For example, data migration service 220 may perform homogenous migrations where the source and target data stores are the same or are compatible (e.g., the same or compatible storage engines, such as the same database engines). In some embodiments, data migration service 220 may perform heterogeneous migrations, where the source and target data stores are different or otherwise not compatible (e.g., different or incompatible storage engines, schemas, file or other data formats, such as different database engines). One or both of source or target data stores may be external to provider network 200 in some embodiments. Alternatively, one or both of source or target data stores may be hosted or implemented within provider network 200 (e.g., on the same or different storage services 210). For heterogeneous migrations, data migration service 220 may automatically convert the data format (e.g., database schema) to a format compatible with the target data store (e.g., a target database schema), in some embodiments. Data migration service 220 may consolidate or combine multiple data sets into a single data store (e.g., multiple databases into one database). FIG. 3 provides further discussion of data migration service 220 below. Data migration service 220 may perform a single copy of data from one data store to another or may provide continuous replication of changes at a source data store to a target data store, in some embodiments.

Other service(s) 230 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 210. Various other distributed processing architectures and techniques may be implemented by data processing services (e.g., grid computing, sharding, distributed hashing, etc.). Note that in some embodiments, data processing operations may be implemented as part of data storage service(s) 210 (e.g., query engines processing requests for specified data). Data processing service(s) may be clients of data migration 220 in order to invoke the execution of a migration task to make data available for processing in a different location or data format for performing various processing operations with respect to data sets stored in data storage service(s) 210.

Generally speaking, clients 250 may encompass any type of client that can submit network-based requests to provider network 200 via network 260, including requests for storage services (e.g., a request to create, read, write, obtain, or modify data in data storage service(s) 210, a request to create or initiate a migration task at data migration service 220, etc.). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that interacts directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 250 and the operating system or file system on behalf of applications executing within the operating system environment.

Clients 250 may convey network-based services requests (e.g., access requests directed to data in data storage service(s) 210, operations, tasks, or jobs, being performed as part of other service(s) 230, or to interact with data migration service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

FIG. 3 is a logical block diagram illustrating a data migration service that may implement a migration recommendation engine, according to some embodiments. Data migration service 220 may implement interface 310, in various embodiments. Interface 310 may provide support various types of interfaces, in some embodiments, including a programmatic interfaces (e.g., Application Programming Interfaces (APIs)), command line interfaces, and/or graphical user interfaces. In some embodiments, a management console or other component may coordinate the generation and implementation of various graphical user interfaces, such as those discussed below with regard to FIGS. 7-11.

Interface 310 may dispatch various requests to appropriate data migration service components, such as migration task management 320 or migration recommendation engine 340.

Data migration service may implement migration task management 320 to manage the resources performing data migration and direct the performance data migration according to received migration tasks. Migration task management 320 may generate workflows or other execution plans for migration tasks, in some embodiments. For example, depending on the configuration of the task, migration task management 320 may include different operations within a workflow to perform a task. For instance, heterogeneous migrations may include operations to convert, transform, or otherwise modify data taken from one data store in order to be compatible with a scheme in a target data store. In another example, a homogenous migration may include a configuration that filters out some data when the data is migrated so that it is not included in the data in the target data store. Migration task management 320 may create a workflow that includes filter operations to apply the desired filter. Migration task management 320 may implement migration workflow execution to generate and or direct the performance of a migration task according to the parameters of the migration task that are received. In some embodiments, migration workflow execution may track which migration tasks have been validated so that upon a request to perform a migration task that has already been validated, the validations may not be performed to migrate different data according to the same migration task (e.g., migrating another partition from the same source data store to the same target data store), in some embodiments.

Migration task management 320 may determine and provision the appropriate number of migration workers 330 to perform a migration. Migration task management 320 may track the status of migration tasks, restart or resume migration tasks, and clean up, release, scrub or prepare migration workers 330 for performing another migration task, in some embodiments.

Data migration service 220 may implement multiple migration workers, such as migration workers 330, in various embodiments. Migration workers 330 may perform the various operations to perform heterogeneous and homogenous migrations, in some embodiments. For example, migration workers may implement migration operation execution engines or platforms, 334, and so on, to perform various migration operations, including operations to read, convert, truncate, modify, reformat, divide, combine, filter, calculate, write, or store data in order to migrate data from a source data store to a target data store, in some embodiments. Migration workers may log operation results or status in migration task log, in some embodiments.

Data migration service 220 may implement migration recommendation engine 340 to perform database migration recommendation engine according to various techniques discussed below with regard to FIGS. 4-13, and may implement recommendation data collection 342, recommendation data normalization 344, and recommendation data analysis 346. Although illustrated as a component of data migrations service 220, migration recommendation engine 340 could be implemented separately as part of a private network (e.g., at a separate host or collocated with an application and/or database) or as a standalone application or system either in provider network 200 or at an external host, in some embodiments.

Figure 4:
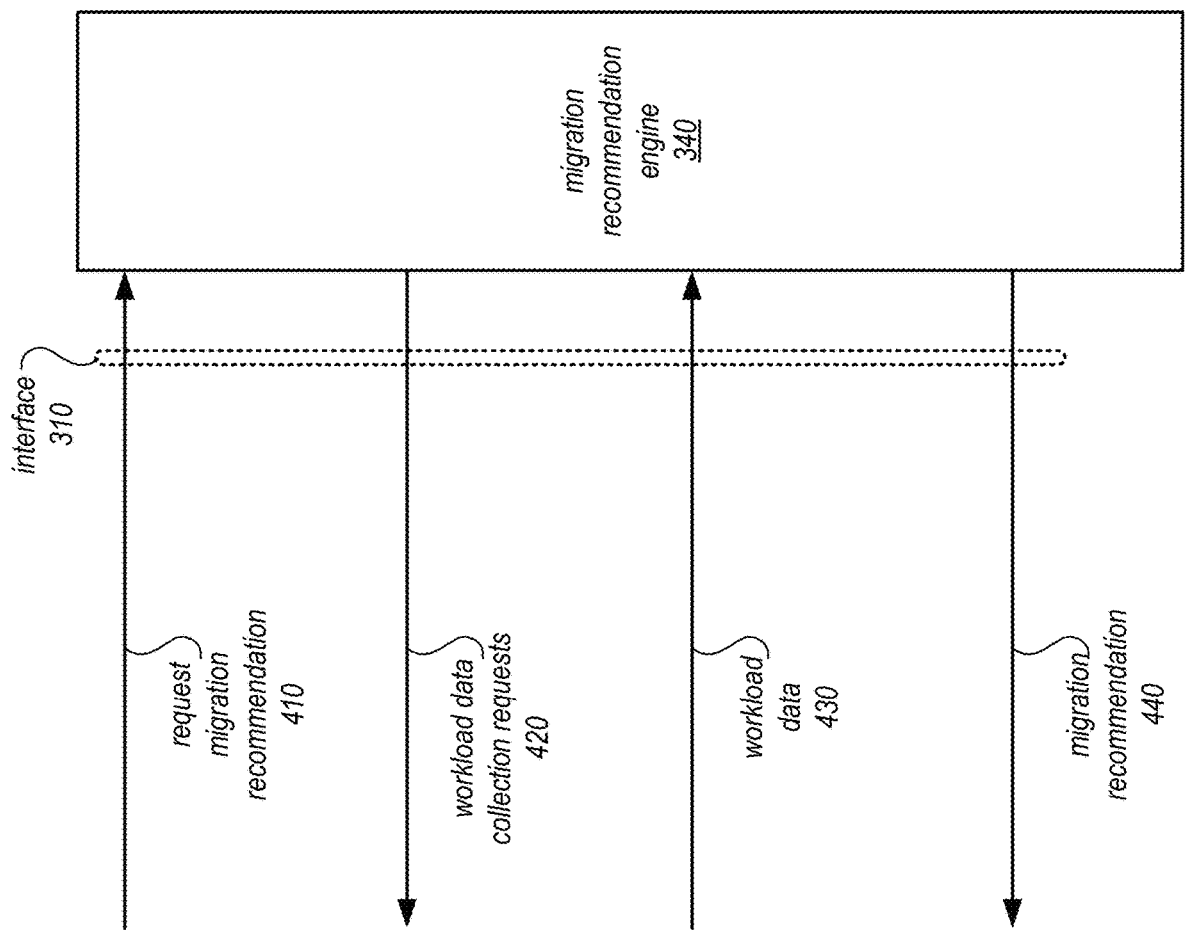
FIG. 4 illustrates example interactions with a migration recommendation engine, according to some embodiments.

FIG. 4 illustrates example interactions with a migration recommendation engine, according to some embodiments. For example, a migration recommendation request 410 may be received via interface 310. The request may be received via a command line interface, graphical user interface (as discussed below with regard to FIG. 7, or other interface element, in some embodiments. The migration recommendation request 410 may be received as part of a larger request to evaluate a group of databases and applications, such as request to generate a migration report, in some embodiments. The migration recommendation request 410 could be generated by and sent as part of automated management tool for the database, such as data migration service 230, in order to determine whether to initiate performance of a migration for the database automatically, in some embodiments. The migration recommendation request 410 may include various information such as schema or configuration information for the database, workload objects, or other information, regarding the use of the database by the client application, in some embodiments, and may include identification information for accessing (or locating) the database, current host (e.g., the second host), client application, or other system or component that impacts workload of the database in order to obtain workload data (e.g., according to the various techniques discussed below).

Figure 5:
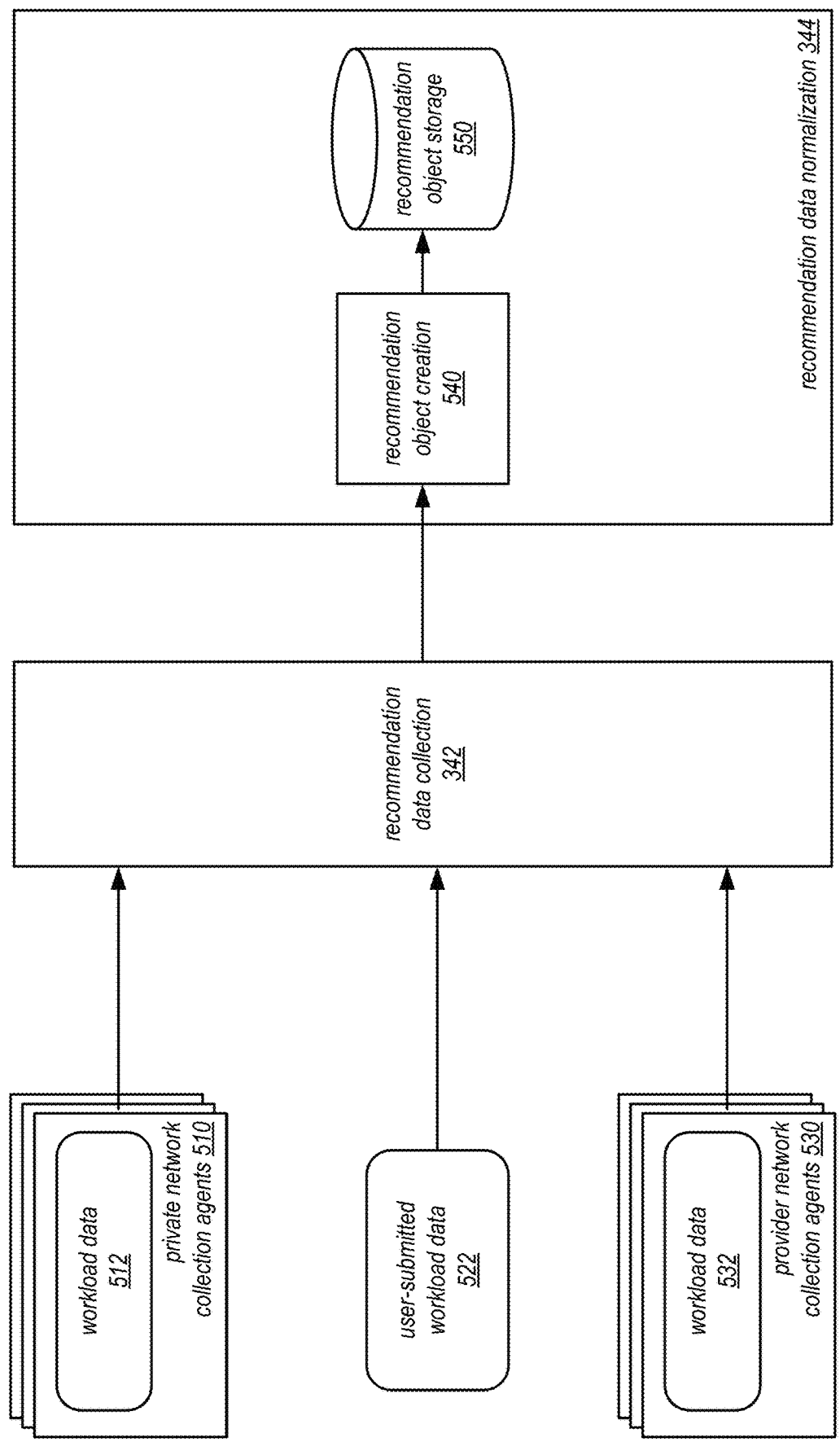
FIG. 5 is an example of data collection that may be implemented as part of a migration recommendation engine, according to some embodiments.

As discussed below with regard to FIG. 13, migration recommendation engine 340 may send out requests (e.g., to users via an interface or instructions to collection agents to track, collect, or otherwise obtain specified data, as depicted in FIG. 5), which may return requested workload data for performing a migration operation, in some embodiments. In some embodiments, the requests may be performed prior to a migration request (e.g., as part of an automated, periodic, or event-driven data collection task), whereas other requests (e.g., requests to a user via an interface) may be made responsive to the migration request 410. The requested workload data 430 may be returned via interface 310, in some embodiments.

Figure 11:
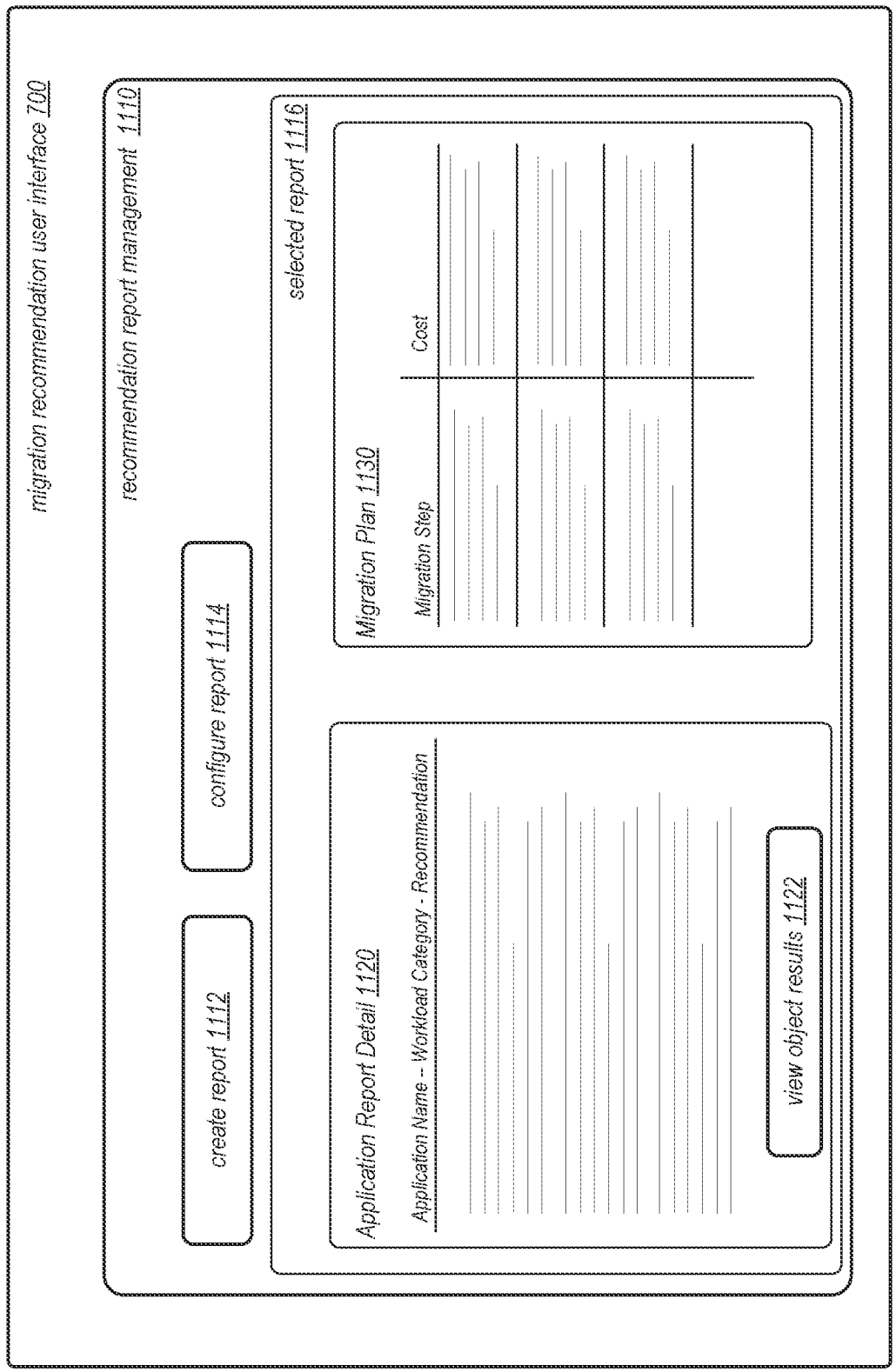
FIG. 11 is an example graphical user interface of recommendation report interface, according to some embodiments.

As indicated at 440, a migration recommendation may be returned, in some embodiments via interface 310. For example, a report as depicted in FIG. 11 may be returned, a workload categorization or file may be returned, or a binary recommendation (e.g., yes or no) may be returned, in some embodiments. In some embodiments, the migration recommendation 440 may be directed to an automated migration system, such as data migration service 220, in order to start or end performance of a database migration.

FIG. 5 is an example of data collection that may be implemented as part of a migration recommendation engine, according to some embodiments. As illustrated in FIG. 5, different types of collection agents (e.g., connectors, discovery agents, user-installed and/or service installed tools) may be used to collect workload data. Private network collection agents 510 may obtain workload data 512 from resources or objects hosted separate from the provider network (e.g., database servers, client application servers, etc.). For example, collection agents could monitor, look into, or receive copies of the requests made to a database in order to determine what types of requests were made (e.g., queries with custom or platform-specific features, special operations, etc.). Private network collection agents 510 can monitor hardware or other resource usage at a database (e.g., processor utilization, I/O utilization, network utilization, and so on). In some embodiments, private network collection agents 510 (or other collection agents, such as provider network collection agents 530) may perform initial data processing (e.g., formatting data, analyzing data, such as time series analysis, or other operations that can reduce workload data to be sent or filter out unwanted data from workload data).

Provider network collection agents 530 may collect workload data 532 from resources or objects hosted in provider network 200 or by making calls, operations, and/or analysis of externally located components (e.g., in a private network hosting the database). For example, provider network collection agents 530 may connect as clients to a database (or client application) in order to request performance data, metadata, configuration information, or other features of workload data. In some embodiments, a migration recommendation request as discussed above with regard to FIG. 4 may include credentials, access paths, network addresses, location, or other information to obtain workload data via provider network collection agents 530.

User-submitted workload data 522 may provide other workload data via a user interface, as discussed below with regard to FIGS. 7-10, in some embodiments. For example, a user may submit workload data that describes various features utilized in client applications (e.g., function calls invoked in client application code) that would need to be supported (or converted/replaced) in order to accomplish the database migration. In some embodiments, user-submitted workload data could include projected use cases, workload scenarios, or increases to current workload (which could be accomplished if the capacity of the destination for the database were to include a higher workload capacity).

Recommendation data normalization 344 may receive the collected workload data, in some embodiments. Recommendation object creation 540 may recognize, create, identify, organize, map, or otherwise associate workload data with objects in recommendation object storage 550 for further analysis, in some embodiments. For example, recommendation object creation 540 may store or normalize numerical measurements (or analyze raw data to obtain the numerical measurements) of various object features, as discussed below, in some embodiments. As discussed below with regard to FIGS. 7-11, migration recommendation engine 340 may utilize object modeling or other representation of the various factors, criteria, or indicators of database workload in order to analyze the workload data to perform a database migration recommendation, and thus recommendation data normalization 344 may apply various mappings, transformations, or other techniques to apply received workload data to the model or format of workload data being used for further analysis, in some embodiments.

Figure 6:
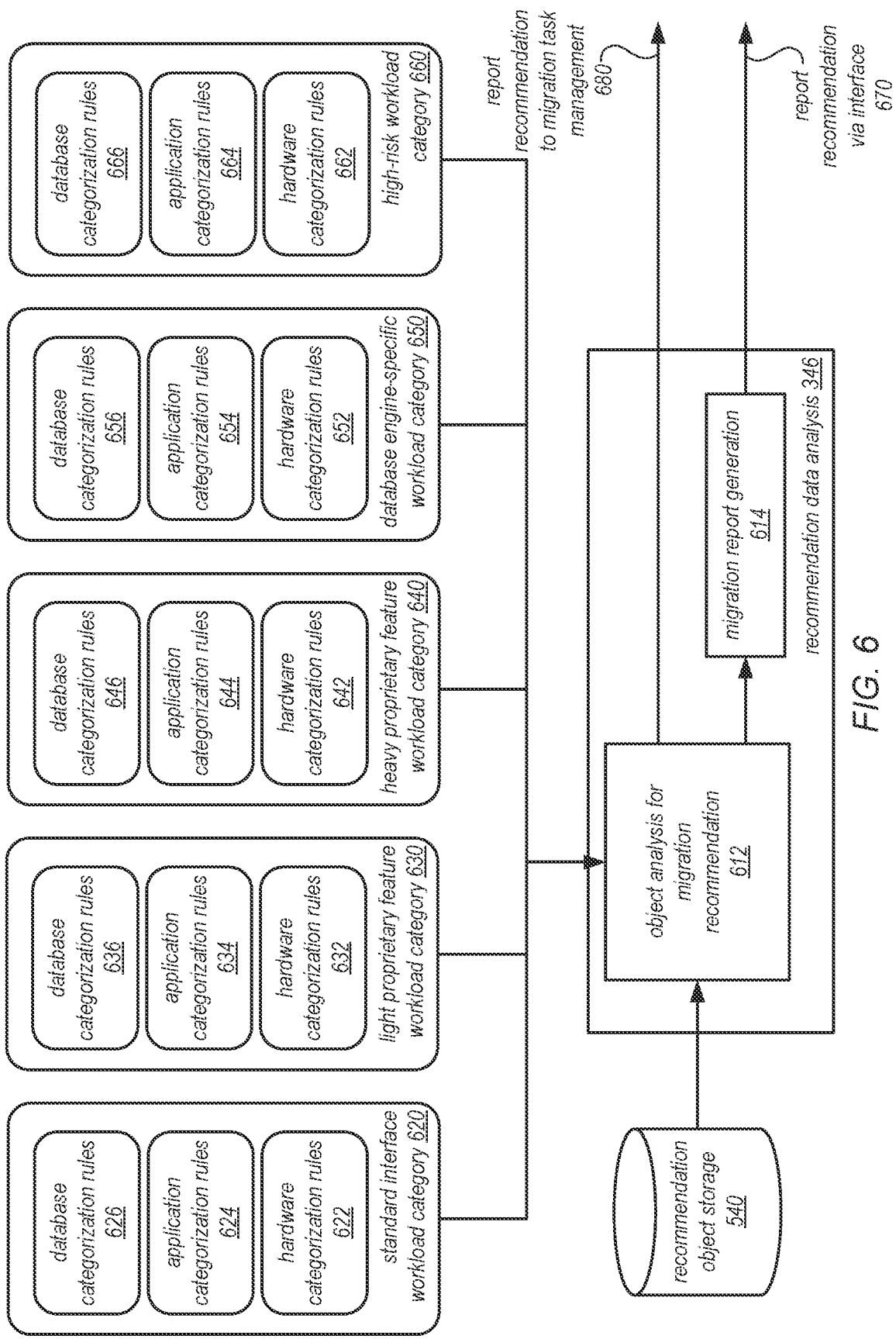
FIG. 6 is an example of recommendation data analysis that may be implemented as part of a migration recommendation engine, according to some embodiments.

FIG. 6 is an example of recommendation data analysis that may be implemented as part of a migration recommendation engine, according to some embodiments. Recommendation analysis 346 may implement object analysis for migration recommendation 612, in some embodiments. Object analysis 612 may access objects and workload data from recommendation object storage 540 and apply different rules to determine a workload classification or category (e.g., according to the techniques discussed below with regard to FIG. 13). Different rules sets, categories, or information may be used to evaluate workloads different than those categories illustrated in FIG. 6, in some embodiments, as discussed below with regard to FIG. 12. Thus, the following example analysis may not be limiting as to other evaluations or analysis that may be applied.

Standard interface workload category 620 may be one category applied to a workload of a database. Applications that use ODBC (Open Database Connectivity)/JDBC (Java Database Connectivity) to connect, as opposed to proprietary drivers that offer non-standard extensions, or will connect through an Object Relational Mapping (ORM) tool such as Hibernate or SpringJDBC may be identified. Application logic that resides in code outside the database (Java, Python, Ruby, etc.) may be identified, in some embodiments. This category may have no or very little (e.g., fewer than some threshold, such as 50) custom stored procedure code, or the stored procedures are very simple and/or used for access controls, in some embodiments. For these workloads, there may be no read-replica or multiple location support required, or these features are offered through replication based technologies, in some embodiments. For OLAP style workloads, a star or a snowflake schema with a reporting layer that does engine specific SQL or ANSI SQL may be identified. Workloads of this category may be easier to migrate and consume less resources to effect (e.g., developer effort), in some embodiments.

Hardware categorization rules 622 may, for instance, may include optimized storage devices for various types of databases (e.g., disk-based storage for OLAP workloads, flash-based storage for OLTP workloads), network connectivity ranges, or other hardware performance criteria. Application categorization rules 624 may include, in some embodiments, whether a type of database connector is present in the application (e.g., an ODBC connector, a JDBC connector, an ORM that may allow different features such as Hibernate, NHibernate, Entity framework, SpringJDBC, or ADO.Net among others). Database categorization rules 626 may, for instance include whether an type of access language is used (e.g., ANSI SQL), a small threshold of program logic (e.g., less than 50 stored procedures), no user defined interfaces, and simple database objects (e.g., tables, views, etc.), in some embodiments.

A light proprietary feature workload category 630 may be one category applied to a workload of a database. Workloads in this category may use a combination of application code (Java, Python, Ruby, etc.) and stored procedure code, which may be used when the logic is cumbersome to implement in application code. There may be less stored procedures (e.g., less than a threshold, such as less than two-hundred stored procedures) and no use of advanced language features, in some embodiments. Schema migration may be simple, as basic data structures like tables and views are used, and there may be no use of user defined datatypes, in some embodiments. OLAP workloads may stage data in tables and transform it using SQL wrapped in simple stored procedures, in some embodiments. OLAP writes may have some micro-batching or a large number of update/deletes and transactions, in some embodiments. OLAP workloads may also make use of proprietary OLAP extensions such as CUBE, ROLLUP, or PIVOT, in some embodiments. Migration may entail moving the stored procedure logic outside the database and reworking SQL reports to deal with the lack of native functions, which may be easy to migrate and consume moderate implementation costs.

Hardware categorization rules 632 may, for instance, may include optimized storage devices for various types of databases (e.g., disk-based storage for OLAP workloads, flash-based storage for OLTP workloads), network connectivity ranges, or other hardware performance criteria. Application categorization rules 634 may include, in some embodiments, whether a range or specific amount of database calls are performed. Database categorization rules 636 may, for instance include whether an extension is used (e.g., OLAP extensions, CUBE, ROLLUP, PIVOT, etc.), whether program logic is within a range (e.g., less than 200 and equal to or more than 50), lack of user defined types, and simple database objects, in some embodiments.

A heavy proprietary feature workload category 640 may be one category applied to a workload of a database. Workloads in this category may use advanced stored procedure logic or proprietary features, in some embodiments (e.g., as high as 100,000 lines of database resident code and features). Workloads in this category use advanced features such as virtual private databases, column obfuscation, tuning options, user defined types, etc., in some embodiments. Workloads in this category may consume a large amount of time for translation into alternate execution environments, in some embodiments. Some of these workloads may rely on hardware (e.g., Exadata, Supercluster, PDW) native features. High performance demanding workloads often fall into this workload category, in some embodiments. The tuning options done on local code may have to be translated and tested with options from the target database in this category, in some embodiments. OLAP style workloads in this Category may contain heavy amounts of stored procedures and user defined functions that either orchestrate ETL or create business views, in some embodiments. These systems may also contain many thousands of tables with a large number of transactions to manage the ETL workflow, which may have to be re-architected in the application to separate the transactional workload from reporting, in some embodiments. In some embodiments logic may be pulled out of the database into another compute layer. These workloads may be hard to migrate and consume migration resources, and constitute a material risk to migrate, in some embodiments.

Hardware categorization rules 642 may, for instance, may include optimized host and/or storage devices (e.g., Exadata, Supercluster, PDW, high performance requirements) for various types of databases (e.g., disk-based storage for OLAP workloads, flash-based storage for OLTP workloads), network connectivity ranges, or other hardware performance criteria. Application categorization rules 644 may include, in some embodiments, a number of database calls and/or whether an ETL process is implemented. Database categorization rules 646 may, for instance include whether a large amount of program logic is implemented (e.g., 100,000 lines of code), usage of advanced features (e.g., virtual private databases, column obfuscation, tuning options, user defined types, and/or the presence of simple database object, in some embodiments.

A database engine-specific workload category 650 may be one category applied to a workload of a database, in some embodiments. Workloads in this category may use frameworks which can work only with a specific database engine, in some embodiments. For example, the application frameworks include Oracle Forms, Oracle Reports, Oracle ADF and Oracle Apex (Application Express), or applications which utilize ado.net RecordSet extensively, in some embodiments. Moving these workloads to an open source database or NoSQL (or other non-relational database) may mean a complete reimplementation of the application in order to separate presentation logic from the database, in some embodiments. An OLAP style workload in this category might heavily use proprietary features such as Geospatial at petabyte scale, proprietary logic in OLAP data structures, or have availability, replication, or thousands of user concurrency requirements which cannot be achieved by a single availability zone architecture (or other distributed system architecture), but with low latency requirements, in some embodiments. These workloads may be very hard to migrate, and may have a high cost to migrate, and may constitute significant risk to migrate, in some embodiments.

Hardware categorization rules 652 may, for instance, include optimized host and/or storage devices for high performance (e.g., multi-user requirements for more than 1,000 users concurrently), network connectivity ranges, or other hardware performance criteria. Application categorization rules 654 may include, in some embodiments, database engine specific features (e.g., Oracle Forms, Oracle Reports, Oracle APEX, Oracle ADF), Ado.net recordset, and/or working with NoSQL style data/databases. Database categorization rules 656 may, for instance include multi-user requirements and multi-zone/location requirements for availability, in some embodiments.

A high risk workload category 660 may be one category applied to a workload of a database, in some embodiments. Workloads in this category may be implemented on database engines for which there is no provider network equivalent, where the underlying operating system is not supported by provider network 200 (e.g., Mainframe, Power or RISC architectures), or where the application is a third-party package that is certified for only a small number of databases, in some embodiments. In some cases, the database may use native code extensions (for example the Oracle Call Interface, or compiled code for which there is no source) to run their business logic, which are often considered legacy by the customer but which may still be business critical. In some cases, customers may not have the source code for these programs, and thus may be unable to easily develop an alternative solution. Data warehouse or other OLAP and OLTP share the same attributes for this Category. These applications may be ported to another virtualization platform offered by provider network 200 (e.g., as part of another provider network service that offers virtual machine or virtual operating system environments), and may include the requirement for emulation technology or other exotic third party solutions. In some cases, the risk of moving these workloads from the existing environment is judged to be too high to justify by the customer, in which case high performance connectivity back to on premises and a network topology that supports the application requirements is appropriate.

Hardware categorization rules 662 may, for instance, may include an unsupported operating system or platform. Application categorization rules 664 may include, in some embodiments, use of third-party components or unsupported/legacy technologies. Database categorization rules 666 may, for instance include use of third-party components or unsupported/legacy technologies, in some embodiments.

Object analysis may provide a migration recommendation according to the workload category to migration task management 680 (which may evaluate and trigger the performance of a migration) and/or to migration report generation 614 which may include the recommendation in a report via an interface, as indicated at 670 and discussed below with regard to FIG. 11. Please note that the previous workload recommendation categories are not intended to be limiting. Other workload recommendation categories could be utilized. For example, a workload category that was mapped to a "do not migrate" recommendation could be utilized (or such a recommendation could be included as part of another category like high-risk workload category 660).

Figure 7:
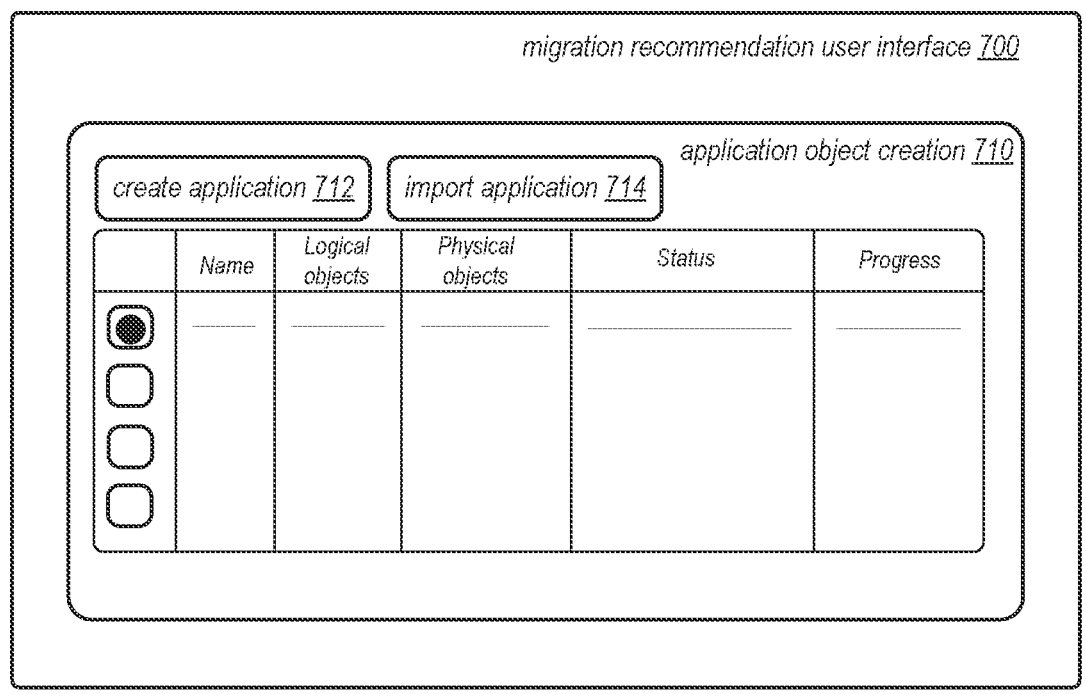
FIG. 7 is an example graphical user interface of an application object creation interface, according to some embodiments.

FIG. 7 is an example graphical user interface of an application object creation interface, according to some embodiments. Migration recommendation user interface 700 may be implemented as part of interface 310 of data migration service 220. Migration recommendation user interface 700 may implement various graphical user interface elements, such as buttons, dials, text entry, drop down lists, popup (or a series of windows/elements), or other display/interface elements to perform various migration recommendation requests or interactions.

Application object creation interface 710 may allow a user to create or import an application object for a migration recommendation, in some embodiments. Element 712, for instance, may trigger one or multiple user interface elements to allow a user to create and configure an application object. Similarly, import application element 714 may allow a user to important an object (e.g., as a JSON or other descriptive file format). The status of created application objects may be displayed for selection (e.g., including information such as the name, number of logical objects, number of physical objects, status, and progress in reporting, in some embodiments.

Figure 8:
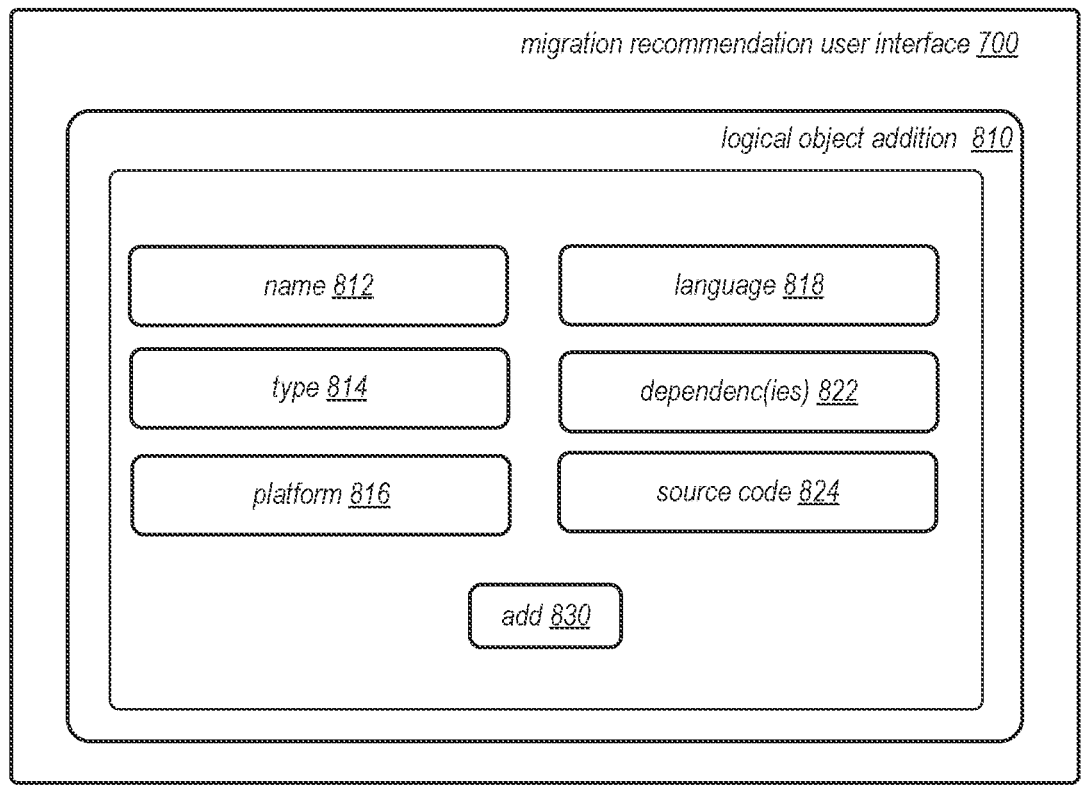
FIG. 8 is an example graphical user interface of a logical object creation interface, according to some embodiments.

FIG. 8 is an example graphical user interface of a logical object creation interface, according to some embodiments. A logical object, as discussed below may include various features that may impact the workload of a database, in some embodiments. Logical object addition interface 810 may provide various input features or elements to create the logical object, such as name 812, type 814, platform 816, language 818, dependencies 822, and source code 824, in some embodiments. Add element 830 may submit the information to create the logical object.

Figure 9:
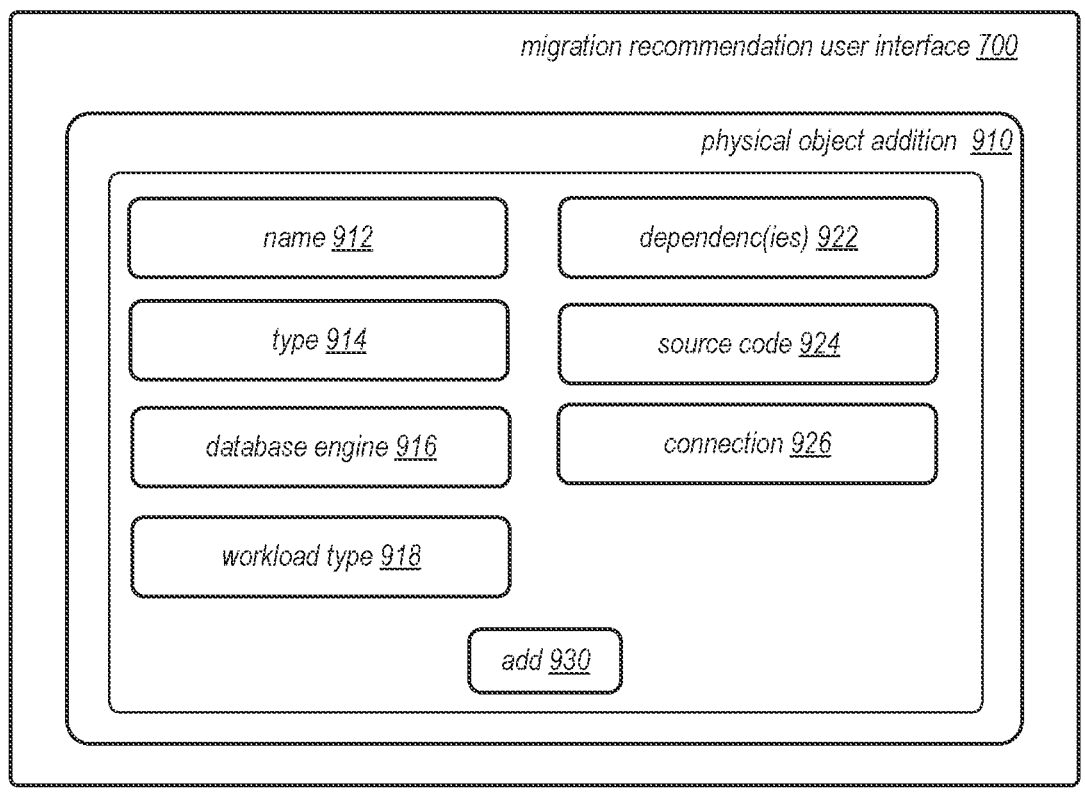
FIG. 9 is an example graphical user interface of a physical object creation interface, according to some embodiments.

FIG. 9 is an example graphical user interface of a physical object creation interface, according to some embodiments. A physical object, as discussed below may include various features that may impact the workload of a database, in some embodiments. Physical object addition interface 910 may provide various input features or elements to create the logical object, such as name 912, type 914, database engine 916, workload type (e.g., OLTP or OLAP) 918, dependencies 922, and source code 924, and connection information 926 (e.g., JDBC, ODBC, paths, or other information), in some embodiments. Add element 930 may submit the information to create the physical object.

Figure 10:
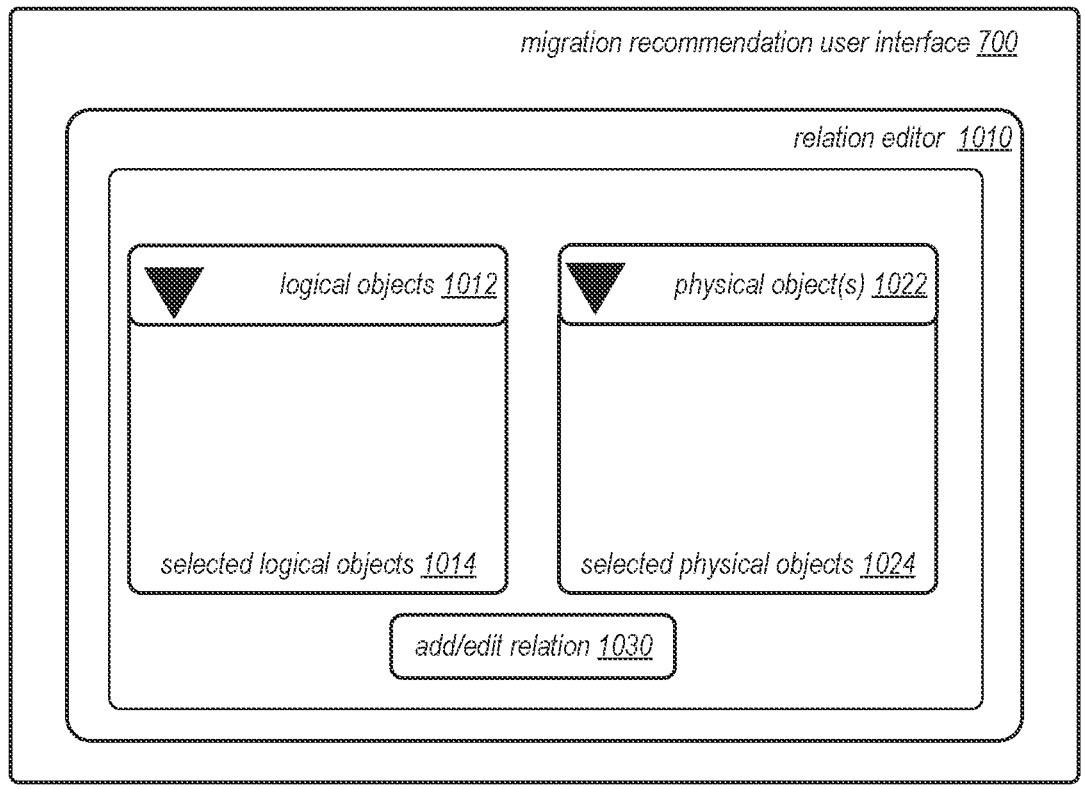
FIG. 10 is an example graphical user interface of an object relation interface, according to some embodiments.

FIG. 10 is an example graphical user interface of an object relation interface, according to some embodiments. Relation editor 1010 may provide an interface for identifying explicit relationships between logical and physical objects, as discussed in detail below with regard to FIG. 13. For example, a logical object 1012 can be selected and included in the selected logical object window 1014. A physical object 1022 can be selected and included in the selected physical object window 1024. Add/edit relation element 1030 can trigger various input fields for creating and editing the relation between the objects, in some embodiments.

FIG. 11 is an example graphical user interface of recommendation report interface, according to some embodiments. A recommendation report can evaluate one or multiple application objects, in some embodiments. Recommendation report management interface 1110 may provide a user with elements to create 1112 or configure reports 1114. A selected report 1116 may include various information descriptive of the identified workload category (as discussed above with regard to FIG. 6) in application report detail 1120. Individual object results may be viewed by selecting further elements, such as view object results 1122. A migration plan 1130 may be provided, in some embodiments, which outlines migration steps and costs (e.g., staffing, resources, time, etc.).

Please note that the prior example user interfaces described and illustrated in FIGS. 7-11 are not intended to be limiting as to other types or graphical or other interfaces that may be used to perform and provide a database migration recommendation.

Figure 12:
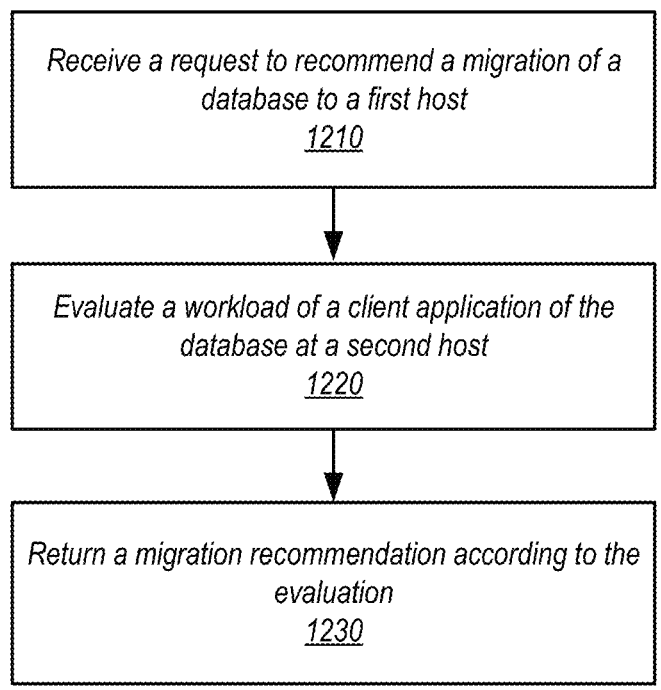
FIG. 12 is a high-level flowchart illustrating methods and techniques to implement evaluating workload for database migration recommendations, according to some embodiments.

Although FIGS. 2-11 have been described and illustrated in the context of a data migration service, the various techniques and components illustrated and described in FIGS. 2-11 may be easily applied to other data access or management systems in different embodiments that may facilitate database migration recommendations, such as data stores or other services. As such, FIGS. 2-11 are not intended to be limiting as to other embodiments of a system that may implement evaluating workload for database migration recommendations. FIG. 12 is a high-level flowchart illustrating methods and techniques to implement evaluating workload for database migration recommendations, according to some embodiments. Various different systems and devices may implement the various methods and techniques described below, either singly or working together. For example, a data migration service such as described above with regard to FIGS. 2-11 may implement the various methods. Alternatively, a combination of different systems and devices may evaluate workload for database migration recommendations as described in the below techniques. Therefore, the above examples and or any other systems or devices referenced as performing the illustrated method, are not intended to be limiting as to other different components, modules, systems, or configurations of systems and devices.

As indicated at 1210, a request may be received to recommend a migration of a database to a first host, in various embodiments. A migration recommendation request may be received in various formats. For example, in some embodiments, the migration recommendation request may be received via a command line interface or graphical user interface. The migration recommendation request may be received as part of a larger request to evaluate a group of databases and applications, such as request to generate a migration report, in some embodiments. The migration recommendation request could be generated by and sent as part of an automated management tool for the database, such as data migration service 230, in order to determine whether to initiate performance of a migration for the database automatically, in some embodiments.

The migration request may include various information, as discussed above, in some embodiments. For example, the migration request could include some schema or configuration information for the database, workload objects, or other data, regarding the use of the database by the client application, in some embodiments. The migration request may include identification information for accessing (or locating) the database, current host (e.g., the second host), client application, or other system or component that impacts workload of the database and/or credentials or other information to obtain workload data.

As indicated at 1220, a workload of a client application of the database at a second host may be evaluated, in various embodiments. Workload data for the client application may be preemptively collected and stored by migration recommendation engine, in some embodiments, before the migration recommendation request is received, in some embodiments. In some embodiments, the workload may be obtained reactively by requesting data from one or multiple sources (e.g., as discussed above with regard to FIGS. 4 and 5). The evaluation of the workload may be performed in different ways. In some embodiments, a workload type may be identified for a database and client application (e.g., as different client applications of a same database may have different workload types. For example, features of the workload may be extracted from workload data and compared with a classification model generated for evaluating workload (e.g., by various machine learning techniques trained upon previous data migration, workload features, complexity, cost, or effort indications to perform the data migration, success or failure of the data migration, etc.) to determine the workload type. As discussed below with regard to FIG. 13, a rules-based analysis for multiple different workload categories may be performed in order to make an evaluation of the workload (e.g., which may be mapped to a workload type or category).

As indicated at 1230, a migration recommendation may be returned according to the evaluation, in some embodiments. For example, the migration recommendation can be a binary recommendation (e.g., yes migrate the database or no, do not migrate the database), in some embodiments. A confidence value of success determined from the evaluation could be compared with a threshold to make the binary recommendation. In some embodiments, the migration recommendation could include a scale of increasing difficulty, complexity, cost, or other factor (or combination of factors). For example, as discussed above with regard to FIG. 6, the workload of the database could be categorized and corresponding category information for the migration could be provided (e.g., a difficulty or complexity value corresponding to the identified workload category).

In some embodiments, the migration recommendation could include information to perform or authorize the performance of the migration. For example, as discussed above with regard to FIG. 11, the migration recommendation could include a number of steps or operations to complete the migration, or the migration recommendation could request a response or acknowledgement to allow performance of the migration by an automated migration tool or system (e.g., data migration service 220 in FIG. 2). As noted earlier, the migration recommendation could be included as part of a report generated for a number of databases and applications which could be delivered via a graphical interface (e.g., as illustrated in FIG. 11) or may be delivered (e.g., via an electronic messaging or communication system) as report object or file. In this way, the migration recommendation can improve the performance of database migration operations, by proactively identifying high-risk or high-cost migrations, specific features or challenges to the database migration, or otherwise provide detailed operations to avoid database migration errors or costs which a database migration system would otherwise incur if the recommendation were not obtained.

Figure 13:
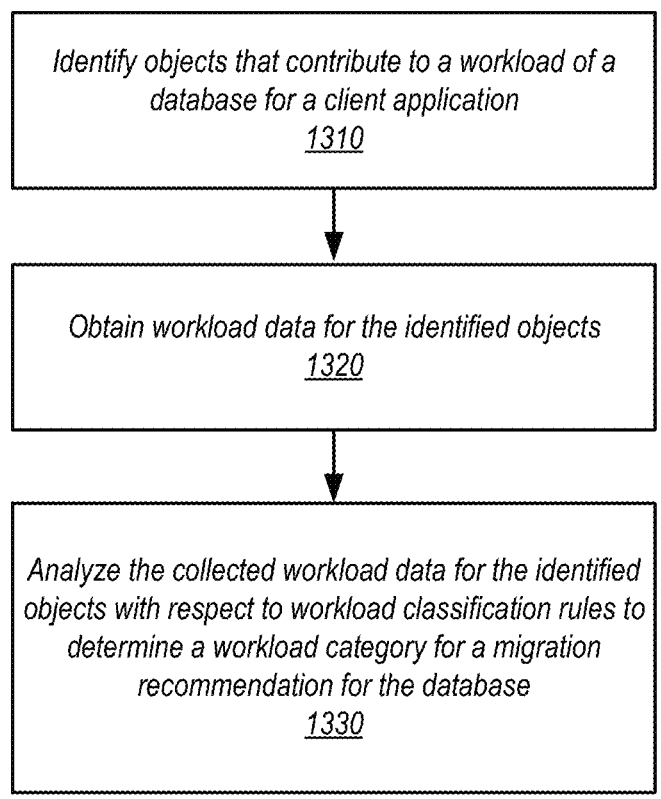
FIG. 13 is a high-level flowchart illustrating methods and techniques to determine a workload category for database migration recommendation, according to some embodiments.

FIG. 13 is a high-level flowchart illustrating methods and techniques to determine a workload category for database migration recommendation, according to some embodiments. As indicated at 1310, objects that contribute to a workload of a database for a client application may be identified, in some embodiments, for analysis (e.g., as part of an object-based model of database and client application workload). Objects may, in various embodiments, be representations of different systems, components, environments, applications, database engines, processes, networks, infrastructure, or other features of the workload of database for a client application that may be analyzed for workload categorization. Objects may be identified in various ways. For example, in some embodiments, objects may be identified via user interface (e.g., as discussed above with regard to FIGS. 7-10). Objects may also be automatically detected, discovered, or determined (e.g., based on a knowledge based that includes template configurations for databases and client applications) from external tools, discovery agents, data collection agents, third-party or remote applications, or other sources, in some embodiments.

In at least some embodiments, objects may include a data application suite, which may be a collection or group of applications that share use at least some of the same data. The data application suite could be identified via a user interface, questionnaire, or an automated tool (e.g., which could detect connections to the shared data).

In some embodiments, an object could be an application. A data application may be one or more application modules that collect, store, manipulate, exchange, and/or expose data in the database. In some embodiments, the relations between the data application another other objects may be one or more application modules, shared data, hardware, and/or application containers to be deployed. The application could be identified via a user interface, questionnaire, or an automated tool, in some embodiments.

In some embodiments, an object may be an application module, which may be a logical container for coordinated objects related to a particular task, with optional programming logic. The application module may be related to other application modules directly (or through shared data), hardware, application containers to be deployed and/or may use other services. The data application suite could be identified via a user interface, questionnaire, or an automated tool (e.g., discovery agents and/or by loading and analyzing metadata information of known application containers), in some embodiments.

In some embodiments, an object may be hardware, which may include physical or virtualized resources (e.g., virtual machines), network, and storage devices, among other resources. Hardware may be related to and used by application modules and/or application containers. Hardware may be identified by analyzing information collected by discovery agents or via a user interface or other automated tool, in some embodiments.

In some embodiments, an object may be an application container. An application container may be an operating system, web platform, application or database server that acts as a managing and/or an execution environment for application modules (which may enforce database access patterns, in some scenarios. In some embodiments, an application container may use hardware (e.g., according to a particular configuration) in order to be deployed and/or may also act as data storage. In some embodiments, an application container may be identified by analyzing information collected by discovery agents, parsing and analyzing source code of previously identified application modules, or other automated tools/components, or may be manually identified via a user interface, in some embodiments.

In some embodiments, a database server may be an object. The database server may use or be an application container for deployment and/or execution of queries (e.g., SQL scripts), vendor-specific database libraries, and so on. In some embodiments, the database server may act as storage. The database server may be identified by analyzing information collected by discovery agents, usage of a service may be made by specific application modules to evaluated, parse, or otherwise analyze database server or application module source code, or other automated tools or components, or a manual identification via a user interface, in some embodiments.

In some embodiments, a service may be an object. A service may be a mechanism to enable access to one or more capabilities, where the access is provided using a prescribed interface and is exercised consistent with constraints and policies as specified by the service description, such as email services, or schedulers. In some embodiments, information about service payload may be collected. Services may be used by application modules and may be identified by analyzing information collected by discovery agents (e.g., by analyzing application module source code), or other automated tools, or manually be identified by a user interface, in some embodiments.

In some embodiments, an access request, script, or other invocation of the database (e.g., a SQL script) may be an object. The access request may include database schema information and may be found or used by an application module, in some embodiments. The access request may be identified as a file and/or reconstructed by an automated tool analyzing metadata information of known database servers, in some embodiments, for example, or may be identified using a manual interface, in some embodiments. In some embodiments the access request may be formatted according to a database style, such as an Online Transaction Processing (OLTP) database or an Online Analytical Processing (OLAP) database.

An object may be a stand-alone client, in some embodiments. The client may, for example, be implemented using various programming language technologies (e.g., Java, .Net, Python, for instance) and may be an executable that could be deployed on some application container, in some embodiments. The stand-alone client object could be identified as a set of various source files, which may be stored at some control system, in some embodiments, according to an automated tool, or may be identified via a manual interface.

An object may be a proprietary or non-standard client (e.g., 4GL client application), in some embodiments. The proprietary client application may include embedded procedural logic (e.g., SQL), which can be extracted and implemented inside of new or target host as a stored procedure(s). The proprietary client could be identified as a set of various source file(s), which may be stored at some control system, in some embodiments, according to an automated tool, or may be identified via a manual interface.

A database library may be an object, in some embodiments. A database library may be implemented in various programming language technologies (e.g., Java, .Net, Python, etc.) which could be deployed on database servers and used by access requests (e.g., SQL scripts). The database library could be identified by analyzing metadata information of known database servers and/or by parsing and analyzing source code of previously discovered application modules, or other automated tools, or may be identified manually via an interface, in some embodiments.

Data storage may be an object, in some embodiments. Data storage may provide the ability to store, organize, access, manipulate and/or expose data and/or metadata, in some embodiments. Availability, security, and capacity information may be collect, in some embodiments. Data storage may be associated with application modules through data channels, in some embodiments. Data storage may be identified by analyzing information collected by discover agents and/or by loading and analyzing metadata information of known application containers and/or by parsing and analyzing source code of previously discovered application modules, or other automated methods, or manually via a user interface, in some embodiments.

An external extract, transform, load (ETL) script may be an object, in some embodiments. The object may be identified as an application module. The access request may be identified as a file and/or reconstructed by an automated tool analyzing metadata information of known database servers, in some embodiments, for example, or may be identified using a manual interface, in some embodiments.

A deployment script may be an object, in some embodiments. A deployment script may be implemented in various programming language technologies (e.g., Java, .Net, Python, etc.) which could be deployed on database servers and used by access requests (e.g., SQL scripts). The deployment script could be identified by analyzing metadata information of known database servers and/or by parsing and analyzing source code of previously discovered application modules, or other automated tools, or may be identified manually via an interface, in some embodiments.

A database driver may be an object, in some embodiments. The database driver may be used by application modules and/or application containers to communicate with database servers, in some embodiments. The database driver may be identified by analyzing information collected by discover agents and/or by loading and analyzing metadata information of known application containers and/or by parsing and analyzing source code of previously discovered application modules, or other automated methods, or manually via a user interface, in some embodiments.

An executable may be an object, in some embodiments. The executable may be an on-demand or scheduled feature. The executable may be an application module that is deployed on one or more containers, in some embodiments. The executable may be identified by analyzing information collected by discover agents and/or by loading and analyzing metadata information of known application containers and/or by parsing and analyzing source code of previously discovered application modules, or other automated methods, or manually via a user interface, in some embodiments.

A third-party application or legacy application (or unsupported application) may be an object, in some embodiments. There may be no source code or limited customization capabilities, database server, and/or data storage configurations/requirements for third party application to consider, in some embodiments. A third-party application may be a data application that access the same data as other applications and could be identified by analyzing information collected by discovery agents or other automated tools, or may be manually identified via a user interface, in some embodiments.

A data channel may be an object, in some embodiments. Security information and/or performance information may be provided/collected for a data channel, in some embodiments. A data channel may be used by application modules and/or application containers to communicate with database servers, in some embodiments. A data channel may be identified by application modules that make use of the data channel by an automated tool (e.g., a sniffer or other data collection agent) that detects usage, or manually via a user interface, in some embodiments.

A source control system may be an object, in some embodiments, and may act as a managing environment for application modules. The source control system may be an application container, and could be identified via an automated tool and/or manually via a user interface, in some embodiments.

As indicated at 1320, workload data for the identified objects may be obtained, in some embodiments. As discussed above, different agents, tools, user interfaces, analyses, or other information sources may provide workload data. Workload data may be represented in various ways. For example, different object properties or values may be obtained, in some embodiments. For example, regular properties could be characteristics of objects, such as a number of lines of code for a script. The property may be collected or otherwise obtained manually via user interface and/or via an automated tool (e.g., a discovery agent), in some embodiments. Workload data may be a service property, which may be a link to an analyzed object source code or metadata storages (e.g., connection parameters for the database server where an access request/script object is deployed), in some embodiments.

In some embodiments, workload data may be mapped to categories (as discussed above with regard to FIGS. 5-6 according to various rules). For example, workload data may be represented as a Boolean value (e.g., an access request/script has a Boolean value for the property "has a proprietary logic in OLAP data structure=TRUE" or a mapping between a type of object and a category (e.g., based on its existence, such as property client may be automatically mapped to certain categor(ies)), in some embodiments.

Numeric values may be used as part of workload data, in some embodiments. For example, numerical values may be mapped to categories via ranges (e.g., less than 50 is category A, less than two-hundred and greater than 50, equal to 50 is category B, and so on) or specific values (e.g., number of concurrent users for a data channel where 2 users maps to category A and 3 users maps to category B, and so on). Numeric values may be combined or considered as a group/combination (e.g., 3 access/script objects may be summed together and considered as one, such as a sum of the number of non-trivial SQL routines for each access/script object).

In some embodiments, some workload data may be not be predefined or previously specified. For example, functional feasibility (e.g., unsupported functionality) and/or migration complexity (e.g., migration effort) and could be identified using source code analysis, in some embodiments. Performance, security, high availability and other workload data may be obtained by analyzing hardware configuration and/or collect statistics of its behavior (CPU usage, data transfer size, etc.) over certain period via automated tools that collect and return the workload data using API calls (passing specified necessary service properties, such as computer or VM names), in some embodiments.

As indicated at 1330, the collected workload data for the identified objects may be analyzed with respect to workload classification rules to determine a workload category for a migration recommendation for the database, in some embodiments. Workload classification rules, such as those discussed above with regard to FIG. 5 may be applied. For example, in some embodiments, a workload category may be determined by evaluating each object to determine a category value and take the maximum category of all object categories as the workload category for the migration. In other embodiments, weightings or other combinations of object analysis with respect to the different categories may be used to determine the overall workload classification. In at least some embodiments, a user can specify some objects, workload data, or other information to exclude (or manually modify) from consideration in the analysis.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 14:
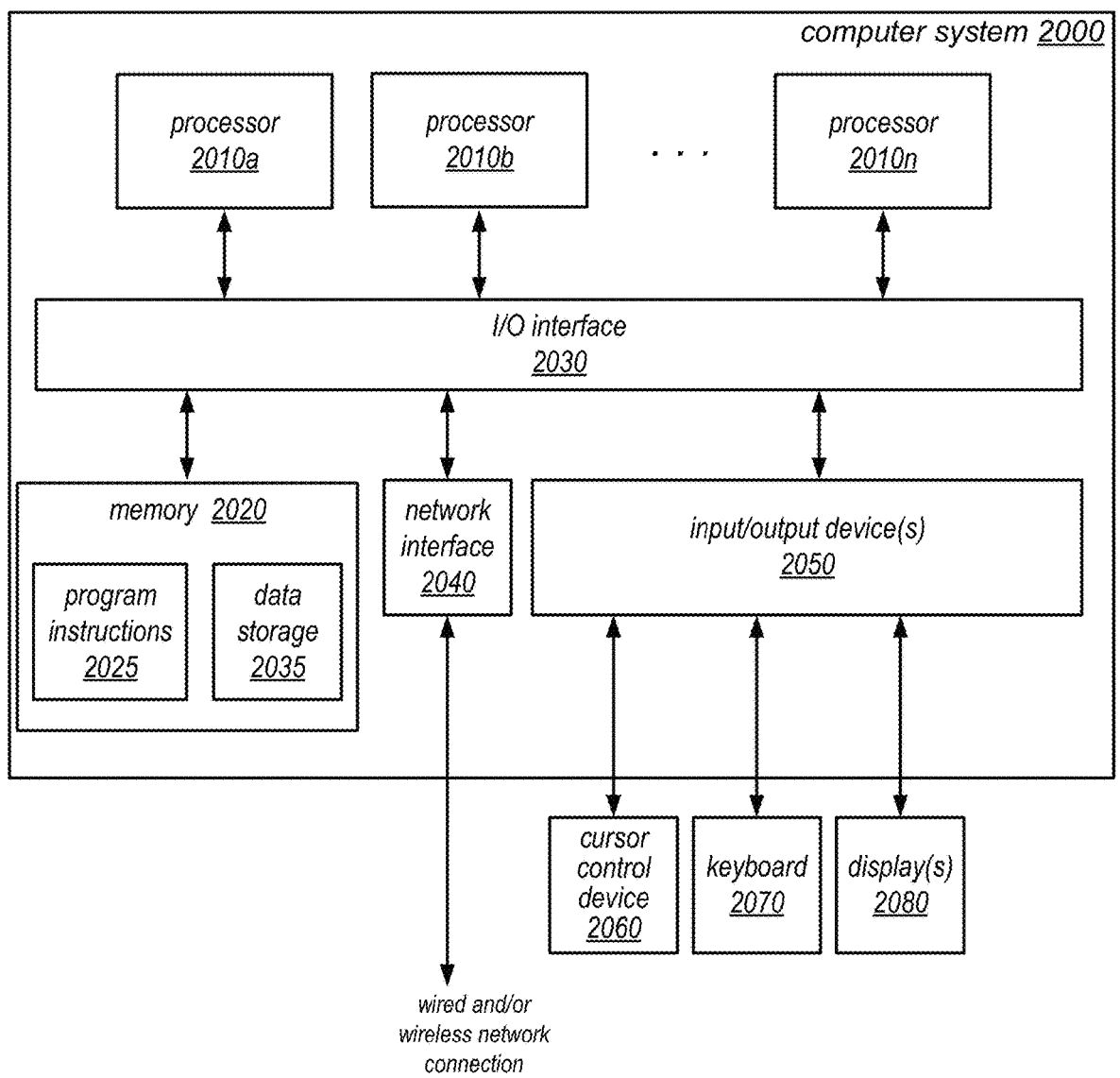
FIG. 14 illustrates an example system that may implement the various methods, techniques, and systems described herein, according to some embodiments.

Embodiments of evaluating workload for database migration recommendations as described herein may be executed on one or more computer systems, which may interact with various other devices. One such computer system is illustrated by FIG. 14. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system, compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 14, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory storing program instructions which, when executed by the at least one processor, cause the at least one processor to implement a migration recommendation engine configured to:
   receive, via an interface, a request indicating a database to be migrated from a second host to a first host and requiring the migration recommendation engine to provide a recommendation of the migration;
   responsive to the received request, obtain historical workload data indicative of how a client application utilizes the database at the second host, wherein the historical workload data comprises copies of queries to the database dependent on one or more custom features;
   evaluate the historical workload data comprising the copies of the queries with respect to one or more workload classification rules to determine one from a plurality of workload categories for the database corresponding to the custom features, wherein the respective workload categories indicate different values of complexity for migrating the database from the second host to the first host; and
   return, via the interface, the recommendation comprising information corresponding to the value of complexity indicated by the determined workload category to trigger a data migration service to migrate the database from the second host to the first host, wherein performance of the recommendation to migrate the database to the first host allows the one or more custom features to be removed from the client application in accordance with one or more features supported by the first host to be used in place of the one or more custom features.

2. The system of claim 1,
   wherein the program instructions cause the at least one processor to further identify one or more objects that contribute to the historical workload data of the client application of the database at the second host; and
   wherein to obtain the historical workload data for the client application the program instructions cause the at least one processor to obtain respective historical data for the one or more objects.

3. The system of claim 1, wherein to obtain the historical workload data for the client application of the database at the second host the program instructions cause the at least one processor to send one or more requests to one or more data collection agents or a user via an interface to provide at least some of the historical workload data.

4. The system of claim 1, wherein the at least one processor is implemented as part of the data migration service offered by a provider network, wherein the first host is implemented as part of a database service offered by the provider network, and wherein the second host is implemented external to the provider network.

5. A method, comprising:
   responsive to receiving, via an interface of a migration recommendation engine implemented using at least one processor, a request indicating a database to be migrated from a second host to a first host and requiring the migration recommendation engine to provide a recommendation of the migration:
   obtaining historical workload data indicative of how a client application utilizes the database at the second host, wherein the historical workload data comprises copies of queries to the database dependent on one or more custom features;
   evaluating the historical workload data comprising the copies of the queries to determine one of a plurality of workload categories for the database corresponding to the custom features, wherein the respective workload categories indicate different values of complexity for migrating the database from the second host to the first host; and
   returning, via the interface of the migration recommendation engine, the migration recommendation comprising information corresponding to the value of complexity indicated by the determined workload category to trigger a service to migrate the database from the second host to the first host, wherein performance of the recommendation to migrate the database to the first host allows the one or more custom features to be removed from the client application in accordance with one or more features supported by the first host to be used in place of the one or more custom features.

6. The method of claim 5, further comprising:
identifying one or more objects that contribute to the historical workload data of the client application of the database at the second host;
obtaining respective workload data for the one or more objects; and
analyzing the obtained respective workload data for the identified one or more objects with respect to one or more workload classification rules to determine the workload category.

7. The method of claim 6, wherein identifying the one or more objects that contribute to the historical workload data comprises receiving an indication of at least one of the one or more objects via an interface from a user.

8. The method of claim 6, wherein obtaining the respective workload data for the one or more objects comprises sending one or more requests for the respective workload data.

9. The method of claim 8, wherein the one or more requests are sent from the migration recommendation engine implemented as part of a service offered by a provider network to one or more data collection agents implemented as part of a private network that includes the second host.

10. The method of claim 5, wherein the migration recommendation is returned to a data migration service that triggers the data migration service to perform the migration of the database from the second host to the first host.

11. The method of claim 5, wherein the migration recommendation request is received as part of a request to generate respective migration recommendations for a plurality of different databases including the database, and wherein the migration recommendation is returned as part of a report that includes the respective migration recommendations for the plurality of databases.

12. The method of claim 5, wherein the database is performing one type of workload at the database.

13. The method of claim 5, wherein the first host is implemented as part of a database service of a provider network, wherein the second host is implemented as part of a private network, and wherein the request for the migration recommendation is received at a migration recommendation engine implemented within the private network.

14. A non-transitory, computer-readable storage medium, storing program instructions that when executed by one or more computing devices cause the one or more computing devices to implement:
receiving, via an interface of a migration recommendation engine, a request indicating a database to be migrated from a second host to a first host and requiring the migration recommendation engine to provide a recommendation of the migration;
obtaining historical workload data indicative of how a client application utilizes the database at the second host, wherein the historical workload data comprises copies of queries to the database dependent on one or more custom features;
evaluating the historical workload data comprising the copies of the queries to determine one of a plurality of workload categories for the database corresponding to the custom features, wherein the respective workload categories indicate different values of complexity for migrating the database from the second host to the first host; and
returning, via the interface of the migration recommendation engine, the migration recommendation comprising information corresponding to the value of complexity indicated by the determined workload category to initiate a service to migrate the data from the second host to the first host wherein performance of the recommendation to migrate the database to the first host allows the one or more custom features to be removed from the client application in accordance with one or more features supported by the first host to be used in place of the one or more custom features.

15. The non-transitory, computer-readable storage medium of claim 14, wherein the program instructions cause the one or more computing devices to further implement:
identifying one or more objects that contribute to the historical workload data of the client application of the database at the second host; and
obtaining respective workload data for the one or more objects;
wherein, in evaluating the workload of the client application of the database at the second host, the program instructions cause the one or more computing devices to implement analyzing the obtained respective workload data for the identified one or more objects with respect to one or more workload classification rules to determine the workload category for the migration recommendation.

16. The non-transitory, computer-readable storage medium of claim 15, wherein, in obtaining the respective workload data for the one or more objects, the program instructions cause the one or more computing devices to implement sending one or more requests for the respective workload data.

17. The non-transitory, computer-readable storage medium of claim 16, wherein the one or more requests are sent to a user via an interface and wherein at least some of the respective workload data is received from the user.

18. The non-transitory, computer-readable storage medium of claim 14, wherein the migration recommendation includes one or more steps to perform the migration and corresponding effort values to complete the one or more steps.

19. The non-transitory, computer-readable storage medium of claim 14, wherein the database is an Online Transaction Processing (OLTP) database or an Online Analytical Processing (OLAP) database.

20. The non-transitory, computer-readable storage medium of claim 14, wherein the one or more computing devices are implemented as part of the service offered by a provider network, wherein the first host is implemented as part of a database service offered by the provider network, and wherein the second host is implemented external to the provider network.

* * * * *